Aug. 20, 1957 R. LUCIEN 2,803,312
HYDRAULIC DOUBLE-ACTING SHOCK ABSORBER
Filed Dec. 4, 1953 2 Sheets-Sheet 1

Aug. 20, 1957  R. LUCIEN  2,803,312
HYDRAULIC DOUBLE-ACTING SHOCK ABSORBER
Filed Dec. 4, 1953  2 Sheets-Sheet 2

United States Patent Office 2,803,312
Patented Aug. 20, 1957

2,803,312

HYDRAULIC DOUBLE-ACTING SHOCK ABSORBER

René Lucien, Paris, France, assignor to Societe d'Inventions Aeronautiques et Mecaniques S. I. A. M., Fribourg, Switzerland, a societe anonyme of Switzerland Application December 4, 1953, Serial No. 396,165

Claims priority, application France August 14, 1953

4 Claims. (Cl. 188—88)

My invention relates to hydraulic double-acting shock absorbers for use notably on automobiles.

It is more particularly concerned with the shock absorber piston itself and with such parts are provided generally in the same and which are adapted, by counteracting the free motion of the same within definite limits, to cause liquid to flow from the one to the other side of said piston while creating the desired loss of head.

In the following description of the shock absorber according to my invention, reference will be had to the type of shock absorber which is described in the French Patent No. 1,081,190, the only difference being that this new piston is substituted for the one described therein.

In shock absorbers of the kind referred to a liquid storage chamber is provided above the cylinder and connections are provided through the piston to refill the two chambers delimited between the two ends of the cylinder and the two faces of the piston in the event liquid should leak out or contract, said connections being provided with so-called refill valves known per se and arranged on the faces of the piston.

Described in the aforementioned application was the novel arrangement of a pair of valves allowing liquid to flow from the one to the other side of the piston during the oscillations. Unlike arrangements already known by that time the pair of valves were situated close to one and the same face of the piston.

My invention resides in a double-acting shock absorber which is characterized thereby that it is provided with means adapted to throttle the liquid flowing from the one to the other side of the piston according to a preestablished law with the aid of one single spring whereby one single reciprocatable member received in an aperture is moved alternatingly in the one and the other directions, said member and said aperture being so profiled as to throttle the liquid according to said law in either direction of displacement.

A further feature of my invention resides in that the piston includes no more than one refill valve located preferably on that side of the piston which is remote from the one which carries the reciprocatable member.

It will be appreciated that the piston described herein provides a decided improvement over the one referred to hereinbefore owing to its simpleness and to its consequently lower manufacturing cost, and this, without impairing the qualities of the shock absorber.

My invention is illustrated in the appended drawing in which.

Figure 1:
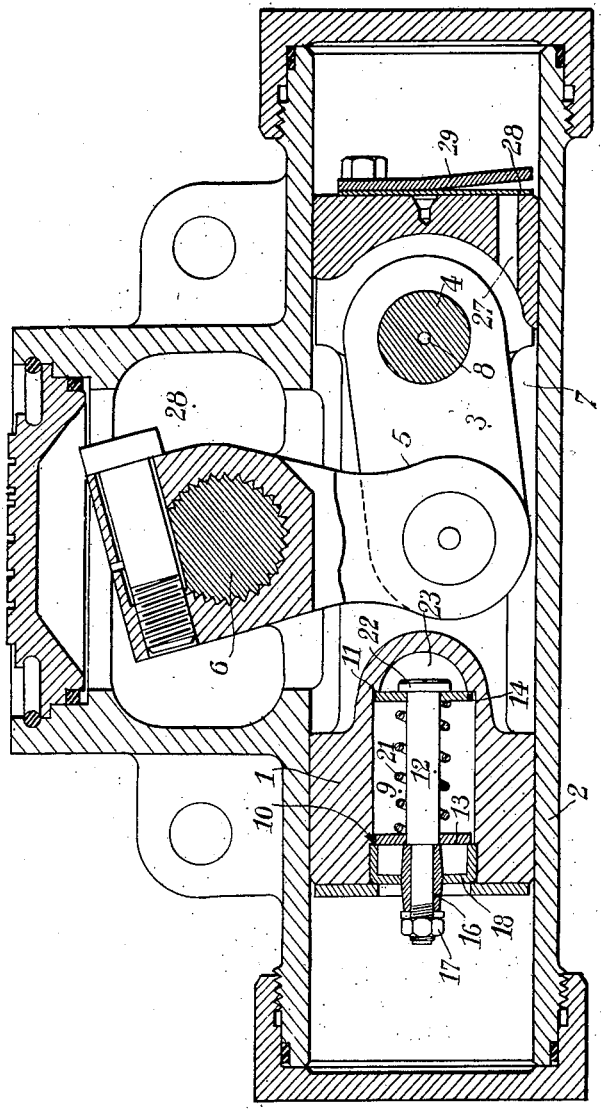
Figure 1 is a longitudinal cross section of the shock absorber parallel to the plane in which the oscillations of the piston-actuating rod occur.
Figure 2:
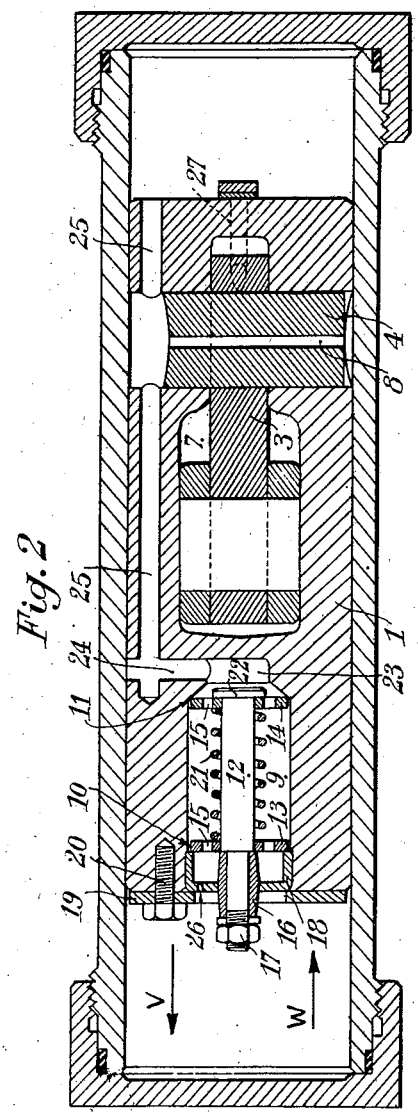
Figure 2 is a cross-section of the shock absorber along the axis of the shock absorber cylinder taken in the plane at right angles with the plane of Fig. 1.

At first, the embodiment shown in Figs. 1 and 2 will be described.

As described in the application already referred to, the piston 1 arranged in a cylinder 2 is oscillated through the medium of a link 3 journaled at its one end on the shaft 4 and pivoted at its opposite end to a crank 5 the shaft 6 of which transmits to said crank 5 the oscillations to be dampened. A chamber 7 is provided within the piston 1 for the accommodation of the link 3.

The shaft 4 is drilled axially with a compensation channel 8 through which liquid can freely flow from any one side of said shaft to the other.

Bored in the one end of the piston 1 is a cylindrical chamber 9 which is formed with a pair of shoulders 10, 11 and which contains the novel device described herein. The latter includes a rod 12 centered by guide rings 13, 14 having holes 15 drilled therethrough. Carried by said rod 12 at the one end thereof is slide valve 16 shaped as a pair of frustums of a cone with a cylindrical portion interposed between their bases. The slide valve 16 may be solid with the rod 12 or preferably assembled therewith e. g. by means of a nut 17 cooperating with a threaded portion of the rod. A diaphragm 18 which is held in position by a keeper ring 19 secured on the end of the piston e. g. by means of screws 20, engages the shoulder 10.

Owing to the action of the calibrated pre-stressed spring 21 the guide rings 13 and 14 are respectively pressed against the diaphragm 18 and against a head 22 rigid with rod 12 or secured thereon.

The extension 23 of chamber 9 communicates through a transversal channel 24 with a longitudinal channel 25, with the piston face on the right hand side of piston 1.

It will be appreciated that as the piston 1 in the cylinder 2 is moved e. g. leftwards, that is, into the direction shown by the arrow V, the rod 12 urged by the hydraulic pressure consequent to the displacement of the piston will be moved to the right in the direction shown by the arrow W while stressing the spring 21 which is rested on the perforate guide ring 14 stopped by the shoulder 11. On the contrary, the perforate guide ring 13 partakes of the displacement of rod 12 and so does slide valve 16. The latter is moved rightwards, its cylindrical portion clears the aperture in the diaphragm and the compressed liquid is permitted to flow through the annular gap created between the left conical portion of the valve and the aperture in diaphragm 18. The section of said annular gap is the larger as the valve is moved farther towards the right; the liquid flows through the holes 15 in the guide rings 13 and 14 and flows into the right hand cylinder chamber of the shock-absorber cylinder via the extension 23 of chamber 9 and via channels 24 and 25.

When the piston is displaced in the reverse direction the rod 12 will likewise be displaced in the reverse direction and so will the direction of flow of the liquid; the latter will then flow leftwards through the channels 25 and 24 while moving rod 12 towards the left and escaping through the annular gap which now is created between the diaphragm 18 and the right frusto-conical portion of the slide valve 16.

In either case the annular section of the gap is proportional on the one hand to the taper of the valve and on the other hand to the elongation of the spring.

If found expedient, a small section gap may be provided between the cylindrical section of the slide valve 16 and the diaphrgam 18, or else, a narrow port 26 may be provided through the diaphrgam 18. The orifice of channel 24 situated in contact with the wall of the cylinder 2 may be closed by means of a screw plug or in any other way.

In the shock absorber according to my invention no more than one single refill channel 27 is needed. By means of the liquid contained in the chambers 28 and 7 the channel 27 is preferably provided at the end of the piston 1 remote from the valve 16. Said channel 27 is provided in a known manner with a spring check strip 28 the displacements of which are limited by a stop plate 29.

Figure 3:
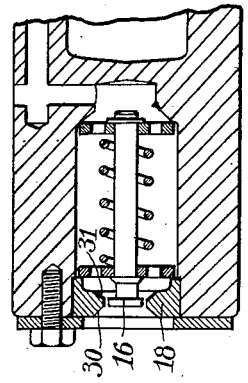
Figure 3 shows another embodiment of the end of the piston shown in Fig. 2.

Fig. 3 illustrates a modification of the piston 1 in which the slide valve 16 is cylindrical while the aperture in the diaphragm 18 through which said slide valve is movable is formed at either side of a cylindrical section 30, 31 with an outwardly flaring section, the effect being just the same as described with reference to the embodiment illustrated in Figs. 1 and 2.

In either embodiment, different cushioning effects at either side of the mean position of the shock absorber can be obtained by unequally tapering the slide valve or the aperture in the diaphragm respectively.

I claim:

1. A hydraulic shock absorber having a cylinder, a piston movable in the cylinder and defining two chambers for fluid therein, the piston having a cylindrically recessed end face and a channel connecting the bottom of the recess thereof with the other end face through the piston, an apertured diaphragm in the mouth of the recess, a slide valve mounted in the diaphragm for movement away from an intermediate position of rest in the aperture of the diaphragm, the diaphragm and valve having cooperating surfaces shaped to define a passage therebetween having an increasing cross-section of flow with the valve moving away from the position of rest, a rod secured to the valve coaxially therewith and extending toward the bottom of the piston recess, abutment means at each end of the rod, an annular disc at each end of the rod slidable thereon in the recess and each having at least one passage therethrough for flow of fluid from one side of the disc to the other, a compression coil spring on the rod urging the discs apart into engagement with the abutment means on the rod, and further abutment means for each disc projecting into the piston recess and spaced apart substantially the same distance as the abutment means on the rod, whereby the passage defined between the cooperating surfaces of the diaphragm and valve has its smallest cross-section with the shock absorber at rest.

2. A shock absorber as in claim 1 wherein the valve is shaped as two frusto-conical elements having a common major base and the diaphragm aperture is cylindrical.

3. A shock absorber as in claim 1 wherein the valve is cylindrical and the diaphragm aperture is shaped as two frusto-conical passages having a common minor base.

4. In a shock absorber as in claim 1, the diaphragm being cup-shaped and fitted in an enlargement of the cylinder recess at the mouth thereof, the rim of the cup-shaped diaphragm abutting against a shoulder defined by the recess and the enlargement, the height of the cup-shaped diaphragm being equal to the depth of the enlargement, the thickness of the rim being greater than the radial dimension of the shoulder whereby the rim defines the further abutment means for one of the discs, and an annular plate secured on the piston end face and defining a retaining flange extending radially inward onto the bottom of the cup-shaped diaphragm.

References Cited in the file of this patent

UNITED STATES PATENTS

| 1,087,890 | Rogers | Feb. 17, 1914 |
| 1,798,536 | Hofmann | Mar. 31, 1931 |
| 1,805,924 | Royce | May 19, 1931 |
| 1,871,911 | Parsons | Aug. 16, 1932 |
| 1,936,876 | Jackson | Nov. 28, 1933 |
| 1,992,232 | Nalle | Feb. 26, 1935 |
| 2,026,769 | Bates | Jan. 7, 1936 |
| 2,552,848 | Gabriel et al. | May 25, 1951 |

FOREIGN PATENTS

| 407,955 | Germany | Jan. 9, 1925 |